United States Patent
Inoue et al.

[11] Patent Number: 6,152,850
[45] Date of Patent: Nov. 28, 2000

[54] TOROIDAL TYPE CONTINUOUSLY VARIABLE TRANSMISSION

[75] Inventors: Eiji Inoue; Atsushi Yamazaki, both of Kanagawa, Japan

[73] Assignee: Isuzu Motors Limited, Tokyo, Japan

[21] Appl. No.: 09/269,714

[22] PCT Filed: Aug. 3, 1998

[86] PCT No.: PCT/JP98/03441

§ 371 Date: Jun. 11, 1999

§ 102(e) Date: Jun. 11, 1999

[87] PCT Pub. No.: WO99/08020

PCT Pub. Date: Feb. 18, 1999

[30] Foreign Application Priority Data

Aug. 5, 1997 [JP] Japan ................................. 9-224372
Aug. 5, 1997 [JP] Japan ................................. 9-224373
Aug. 5, 1997 [JP] Japan ................................. 9-224374

[51] Int. Cl.[7] ................................................. F16H 15/38
[52] U.S. Cl. ............................................ 476/46; 476/40
[58] Field of Search ................................ 476/40, 46, 70

[56] References Cited

U.S. PATENT DOCUMENTS 4,694,704  9/1987  Kraus ................................... 476/46 X
5,823,911  10/1998 Hibi ........................................ 476/40
5,830,103  11/1998 Itoh et al. ......................... 476/40 X

FOREIGN PATENT DOCUMENTS 56-160453  12/1981  Japan.
1-275950  11/1989  Japan.
7-151219   6/1995  Japan.
7-198014   8/1995  Japan.
7-280056  10/1995  Japan.
9-126288   5/1997  Japan.
9-303509  11/1997  Japan.

*Primary Examiner*—Rodney H. Bonck
*Attorney, Agent, or Firm*—Browdy And Neimark

[57] ABSTRACT

A toroidal continuous variable transmission is disclosed in which a supporting shaft for mounting a power roller on a trunnion is kept from leaning thereby helping to ensure a stable speed ratio irrespective of operating conditions. A supporting shaft 5 is mounted to a trunnion 4 for pivoting movement and supports rotatably thereon on a rolling body 30 of a power roller 2. The supporting shaft 5 is press fitted in a fit structure 60 of a back plate 31 so as to form an integral unit. The back plate 31 is forced against the trunnion 4 by the action of a thrust force that is applied from the rolling body 30 through rolling elements 57. This suppresses the lean of the supporting shaft 5 relative to the trunnion 4, resulting in elimination speed ratio variations which might otherwise occur owing to a deviation of the rotational axis of the rolling body 30 in a direction along the pivotal shaft of the trunnion.

8 Claims, 5 Drawing Sheets

TOROIDAL TYPE CONTINUOUSLY VARIABLE TRANSMISSION

CROSS REFERENCE TO RELATED APPLICATION

The present application is the national stage under 35 U.S.C. 371 of PCT/JP98/03441, filed Aug. 3, 1998.

TECHNICAL FIELD

The present invention relates to a toroidal continuous variable transmission consisting of input and output disks having toroidal surfaces drivingly connected by power rollers that are adjustable in tilt output disk in a continuous variable rotary speed changing manner.

BACKGROUND ART

Most toroidal continuous variable transmission have a toroidal rotary speed changer that is composed of an input disk driven by an input shaft, an output disk arranged confronting with the input disk and connected to an output shaft, and adjustable power rollers arranged in frictional rolling-contact with both the disks. In the toroidal continuous variable transmission, varying the tilt of the power roller causes the continuous variable variation in the speed of rotation that is to be transmitted from the input disk to the output disk.

Figure 6:
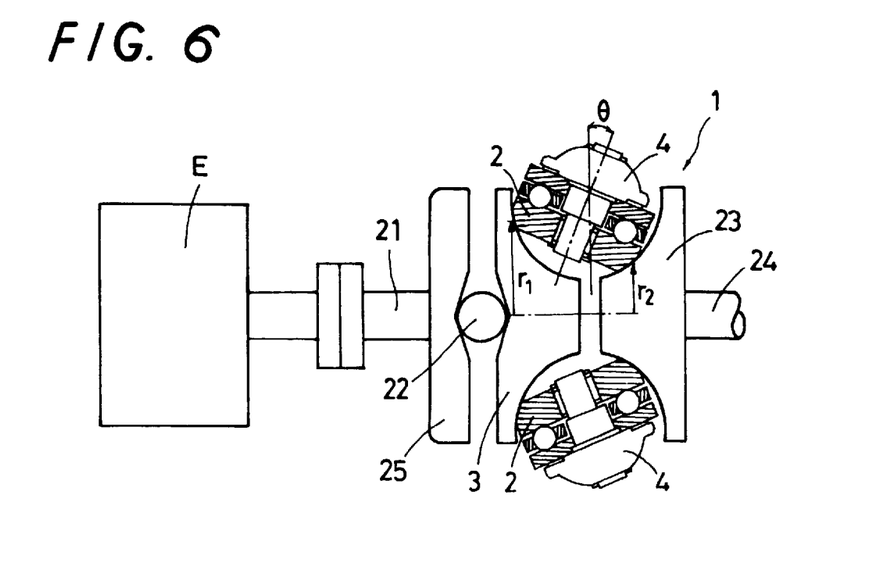
FIG. 6 is a schematic explanatory view, partially in section, illustrating a prior toroidal continuous variable transmission.

An example of toroidal continuous variable transmissions conventionally installed on vehicle is diagrammatically shown in FIG. 6. A toroidal continuous variable transmission 1 installed on the vehicle is comprised of an input shaft 21 for taking off the power of an engine E, an input disk 3 supported for rotation relatively to the input shaft 21, an output disk 23 connected to an output shaft 24 and arranged in opposition to the input disk 3 while for rotation relatively to the input disk 3, a pair of power rollers 2, 2 adjustable in tilt and arranged between the confronting input disk 3 and the output disk 23 so as to transmit the applied torque from the input disk 3 to the output disk 23, and thrust means 22 such as a loading cam provided between a flange 25 attached to the input shaft 21 and the input disk 3 so as to control the magnitude of the contact pressure of the input disk 3 against the output disk 23 dependently on the magnitude of the applied torque, whereby adjusting the tilt of the power rollers 2, 2 may result in the continuous variable speed changing of rotation that is transmitted from the input shaft 3 to the output shaft 32. If the power rollers 2, 2 were adjusted at a tilt angle θ shown in the drawings, the power rollers 2, 2 would be in friction contact with the input disk 3 at a radius $r_1$ while in friction contact with the output disk 23 at a radius $r_2$ and, therefore, the output speed would be $r_1/r_2$ the input speed. In the meantime the members at 4 are trunnions for supporting the adjustable power rollers 2, 2 and will be described in detail later. The tilt angles of the power rollers 2, 2 in the toroidal continuous variable transmission 1 are adjusted by means of a controller unit that will be described hereinafter.

Figure 7:
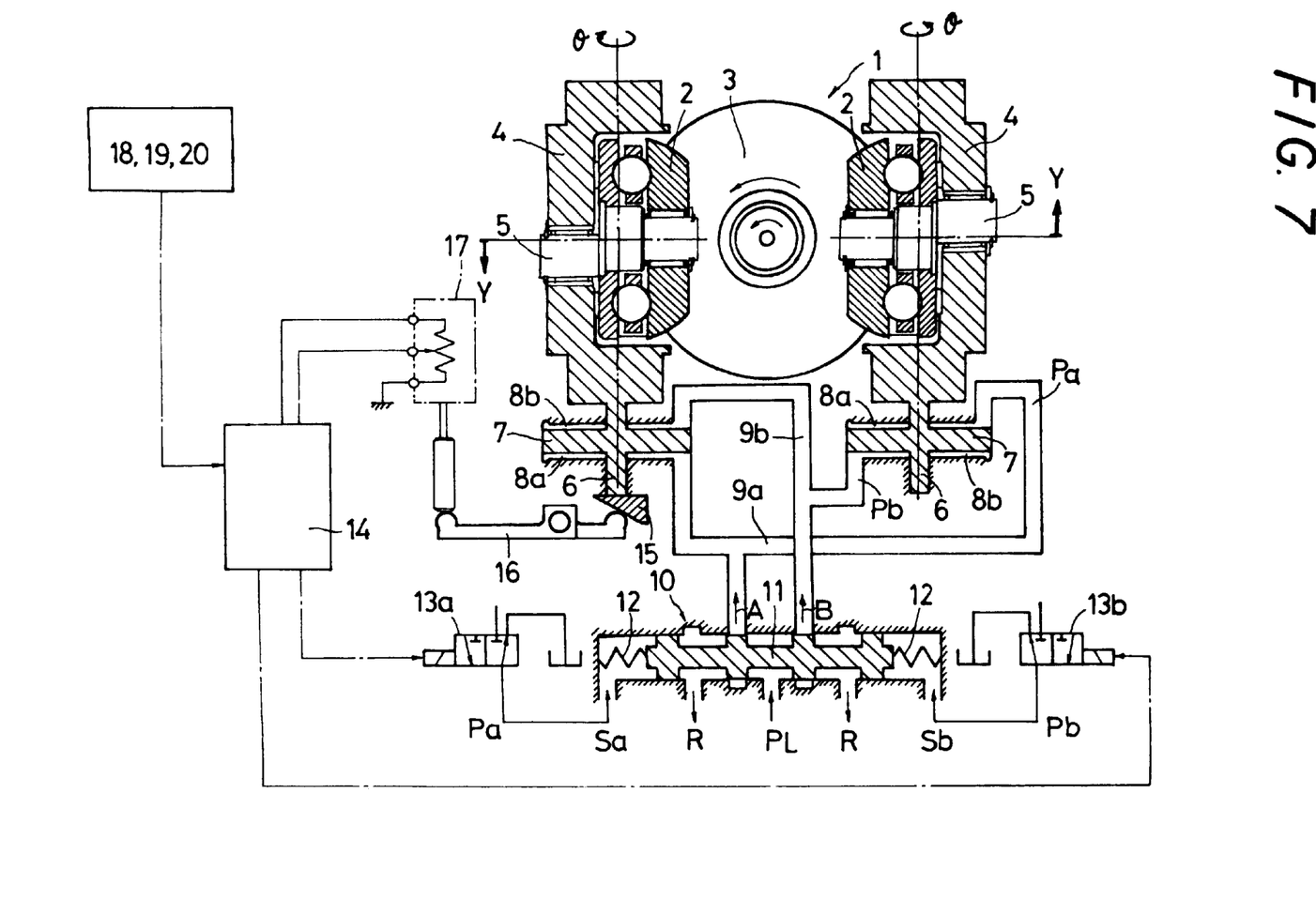
FIG. 7 is a diagrammatic illustration, partly in section, showing an example of the prior toroidal continuous variable transmission in FIG. 6.

Japanese Patent Laid-Open No. 151219/1995 discloses the toroidal continuous variable transmission of the type described just above and the speed-change type described just above and the speed-change control system therefor. FIG. 7 shows an exemplary prior art of the toroidal continuous variable transmission and the speed-change control system therefor. As apparent from the illustration, a pair of adjustable power rollers 2, 2 is arranged confronting with each other between the input and output disks 3, 23. The adjustable power rollers 2, 2 are each supported for pivoting or rocking motion in response to deflections of the space between the confronting input and output disks 3, 23 along the axial direction of the disks, while for rotation in frictional rolling-contact with the input and output disks 3, 23. This support mechanism for the power rollers 2, 2 is a kind of pivot assembly composed of a supporting member, what is called trunnion 4, and a supporting shaft 5 serving as a pivot shaft for the trunnion 4. The trunnions 4, 4 are each mounted to a transmission case (not shown) for rotation as well as axial movement. Moreover the trunnions 4, 4 each have a pivotal shaft, or pivotal shaft 6, and are movable along the axial direction of the pivotal shaft 6 while capable of pivoting movement on the pivotal shaft 6. Connected to the pivotal shaft 6 of the trunnion 4 is a piston 7 that is fitted for sliding movement in a hydraulic cylinder 8 formed in the transmission case. The hydraulic cylinder 8 is divided into two cylinder chambers, or an acceleration chamber 8a and deceleration chamber 8b, with the piston 7.

The cylinder chambers 8a, 8b are each communicated with a sliding-spool valve 10 through hydraulic conduits 9a, 9b. The sliding-spool valve 10 has therein a spool 11 that is movable in a sliding manner and kept at its neutral position by the preload of centering-springs arranged on the opposing ends of the spool 11, one on each end. The sliding-spool valve 10 is provided at opposing ends thereof with ports Sa, Sb, one on each end, the port Sa of which is applied with a hydraulic pressure Pa through a solenoid-actuated valve 13a while the port Sb is open to a solenoid-actuated valve 13b. The sliding-spool valve 10 is further provided with ports PL, A, B and R, the port PL being connected to a hydraulic pressure source, the port A being connected to the acceleration chamber 8a through the hydraulic conduit 9a, the ports B being connected to the deceleration chamber 8b through the hydraulic chamber 9b, and the two ports R being open to oil reservoir. The solenoid-actuated valves 13a, 13b may be actuated in response to control signals from a controller unit 14. It will be thus understood that the solenoid-actuated valves 13a, 13b function as valves for controlling the speed ratio of the output speed to the input speed in the toroidal continuous variable transmission.

Any one of the pivotal shafts 6, 6 is provided at its end with a precessional cam 15, against which is abutted one extremity of a lever 16 that is connected at its opposite extremity to a potentiometer 17. The precessional cam 15 may be made to move in proportion to the axial-linear displacement Y as well as the angular displacement θ of its associated pivotal shaft 6 of the trunnion 4. If both of the linear and angular displacements Y, θ take place on the pivotal shaft 4, the potentiometer 17 will detect the resultant displacement of the linear and angular displacements and produce in proportion to the resultant displacement a potential output V, which is in turn applied to the controller unit 14. The integrated mechanism of the precessional cam 15, lever 16 and potentiometer 17 functions as the detecting means that may detect the potential proportional to the resultant displacement and apply a correction signal to the controller unit 14, which in turn controls the speed-ratio control valve so as to make the speed ratio of the output speed to the input speed coincide with a desired speed ratio. The controller unit 14 is moreover incorporated with a tachometer 18 at a power-take-off shaft, an engine tachometer 19 and accelerometer 20. The controller unit 14 may be applied with signals regarding the speed-changing information such as the rotational frequency of the power take-off shaft, the rotational frequency of the engine, the depression of the accelerator pedal or the like. As an alternative, a vehicle speed sensor may be used in place of the power take-off tachometer 18 and also a throttling sensor may be employed in place of the accelerometer 20.

In the toroidal continuous variable transmission as described just above, when the trunnion 4 is displaced towards any one direction along the pivotal shaft (or the axial direction of the pivotal shaft 6), the power roller 2 may move to thereby shift the rolling-contact circles of the input and output disks 3, 23 with the power roller 2. Owing to the characteristic in which the power roller 2 may make the pivoting movement on the pivotal shaft 6 in the direction and at the speed that occur dependent on the direction and amount of the displacement along the pivotal shaft 6 of the trunnions 4, the continuous variable speed changing may be achieved by adjusting the angular deflection of the pivotal shaft of the trunnion 4.

For transmitting the rotation of the input shaft 21 to the output shaft 24 with changing the ratio of the speed of the input shaft 21 to the speed of the output shaft 24, the loading cam 22 is provided to help ensure the large contact pressure at each rolling-contact area between the power roller 2 and any one of the input and output disks 3, 23. Consequently, regardless of wherever the axial reference position may be in the toroidal continuous variable transmission 1, the input and output disks 3, 23 and power rollers 2, 2, as moving away from the axial reference position due to the tolerance as well as deflection, may be forced to shift dependent on the axial thrust force caused by the cam action of the loading cam 22. On the toroidal continuous variable transmission of double-cavity type in which two set of toroidal speed-changing units are arranged along the axial direction of the power transmitting line of the input shaft 21 and output shaft 24, especially, the power rollers 2, 2 in at least any one of the toroidal speed-changing units are apt to move away from the axial reference position, to thereby make the axial deflection larger. To cope with such axial deflection, the power rollers 2, 2 are supported on the trunnions 4, 4 for rotating as well as for pivoting movements so that the axial deflection occurring in the power rollers 2, 2 along the power transmitting line may be compensated with the pivoting movement of the power rollers 2, 2 on the supporting shafts 5, 5. Alternatively, if the trunnions 4, 4 occupied the axial reference position in the toroidal continuous variable transmission 1, there would be no need for supporting the power rollers 2, 2 on the trunnions 4, 4 for pivoting movement.

Figure 8:
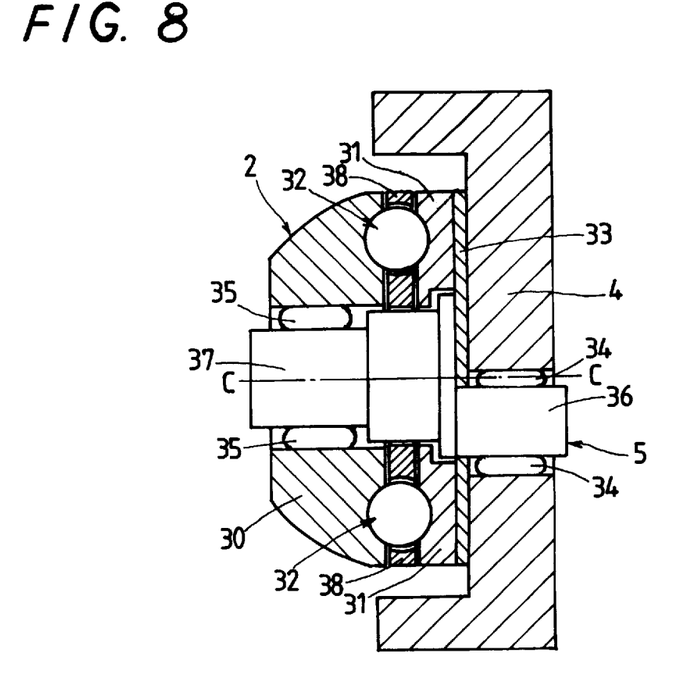
FIG. 8 is an axial-sectional view showing an example of a mounting structure of the adjusting power roller on the trunnion,incorporated in the prior toroidal continuous variable transmission.
Figure 9:
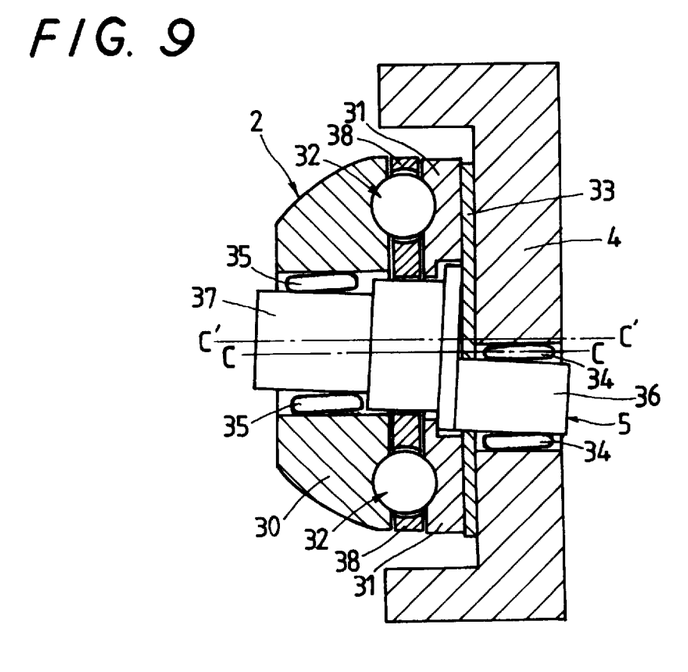
FIG. 9 is an axial-sectional view showing an example of a mounting structure of the adjusting power roller on the trunnion in FIG. 8, in which the supporting shaft of the adjustable power roller is shown on a tilt. On the exemplary embodiments, shown in FIGS. 1 to 5, of the inventions claimed in this application, the toroidal continuous variable transmission system in itself may be identical with the prior transmission shown in FIGS. 6 and 7 and therefore the repetition of the structure and the principal operation thereof will be omitted hereinafter.

The mounting structure of the power rollers 2, 2 on the trunnions 4, 4 will be described with reference to FIGS. 8 and 9. Each power roller 2 is comprised of a rolling body 30, a back plate 31 and a thrust bearing 32 that may bear the rolling body 30 against the back plate 31 for rotation under the thrusting force, which is a force acting on the rolling body 30 along the rotating axis of the rolling body 30. The supporting shaft 5 is further to mount the power roller 2 to the trunnion 4. The supporting shaft 5 comprises a first journal section 36 and a second journal section 37 integral with the first journal section 36, the first journal section 34 being fitted in the trunnion 4 for rotation through a first journal bearing 34 of needle bearing type while the second journal section 37 supporting thereon the rolling body 30 through a second journal bearing 35 of needle bearing type. Alternatively, both the first and second journal sections 36, 37 may be formed separately from each other and connected integrally with each other. As shown in FIG. 8, the first and second journal sections 36, 37 of the power roller 2 are eccentric with each other. The rolling body 30 and back plate 31 are fitted on the second journal section 37 so as to keep the concentricity with each other. Moreover the back plate 31 is born against the trunnion 4 through a thrust bearing 33 of a sliding bearing, needle bearing or the like, which is to bear an urging force exerted from the input and output disks 3, 23. The thrust bearing 32 has rolling elements of ball, which are contained in a cage 38 and held between confronting design raceway grooves that are provided on the opposing roller body 30 and back plate 31.

For miniature structure of the power roller 2 in FIG. 8, the needle bearings are preferably used for the first journal bearing 34 to support the first journal section 36 of the supporting shaft 5 in the trunnion 4 and the second journal bearing 35 to support the rolling body 30 on the second journal section 37 of the supporting shaft 5. The needle bearings 34, 35 each, principally, have a radial clearance while the needles are subject to the crowning at their opposing ends that would be otherwise exposed to the concentrated load. Nevertheless, this causes a major problem in which a lean is liable to arise between the trunnion 4 and the supporting shaft 5 while between the rolling body 30 and the supporting shaft 5.

In addition, the fitting of the back plate 31 on the second journal section 37 of the supporting shaft 5 is carried out by loose fit process in order to make possible the easy assembly of the power roller 2. And then, the back plate 31 is too thin in thickness to resist to a lean of the supporting shaft 5. Therefore, the axis line C—C of rotation of the rolling body 30 in the power roller 2 is apt to sometimes fluctuate due to disturbances or the like even if the desired speed ratio of the toroidal continuous variable transmission is always constant.

For example, as in the case where the torque to be transmitted through the toroidal continuous variable transmission 1 underwent a change in magnitude under such situation that the supporting shaft 5 can not be kept away from its lean, if the rolling body 30 of the power roller 2 undergoes a change in the direction of the tangential force applied to the rolling body 30 from the input and output desks 3, 23, the axis line C—C of rotation of the rolling body 30 in the power roller 2 moves along the pivotal shaft 6. Where the axis line of rotation of the rolling body 30 in the power roller 2 exactly intersects with that of the input and output disks 3, 23, there happens no force to make the power roller 2 tilt or pivot. In contrast, when the axis line C—C of rotation of the rolling body 30 in the power roller 2 moves along the pivotal shaft 6 due to the lean of the supporting shaft 5 with respect to the trunnion 4 so as to deviate from the rotational axis of the input and output disks 3, 23, the power roller 2 is subject to the pivoting force that has a magnitude and acting direction in accordance with the deviation. FIG. 9 illustrates a power roller 2 that has deviated along the pivotal shaft 6 (towards upper side in the drawings)so that the axis of rotation of the rolling body 30 has deviated from its position C—C to another position C'—C'. Such deviation of the rotational axis C—C of the rolling body 30 causes simultaneously the displacement of the rolling-contact area of the rolling body 30 with both the input and output disks 3, 23 along the pivotal shaft 6 in the same direction with that of the deviation. This starts the speed changing in the toroidal continuous variable transmission 1, likewise with the principal of the speed governing in the transmission having toroidal surfaces. That is, this prior structure has a major problem in which the lean of the supporting shaft 5 may force the toroidal continuous variable transmission 1 to start the speed changing operation even if the desired speed ratio is fixed while the trunnion 4 is kept in its tilt.

Moreover the force exerted on the power roller 2 from the input and output disks 3, 23 involves a thrust force along the rotational axis of the power roller 2 and a reacting torque (tangential force) taking place at the transmission of torque. In addition, the reacting torque or tangential force may occur reversely in direction either under the driving condition where the applied torque is transmitted positively or under the coasting condition where the vehicle is carried by inertia. On a tilt of the supporting shaft 6 with respect to the trunnion 4, consequently, the deviation of the rotational axis C—C of the power roller 2 is different in direction, depending on either of the driving and the coast, so that the speed ratio may differ actually under even if the desired speed ratio is to be kept at constant.

On the driving under light load, the tangential force described just above is too small in magnitude to make stable the position of the rotational axis of the power roller 2 relatively to the trunnion 4. Further, as in the case the transmission was changed over between the driving position and the coast position, when the transmission undergoes a change of the torque large in amplitude, this causes an disadvantage in which the vibratory variations of the speed ratio may happen on the same desired speed ratio, resulting in making uncomfortable the riding comfort for the driver. Moreover, the toroidal continuous variable transmission of double-cavity type has a major problem in which as the transient difference may occur in speed ratio between the two set of the toroidal speed-changing units, the speed ratio undergoes changes of relatively short cycle and/or the great torque is caused by the torque circulation in the speed-changing units with resulting in the possibility of transmission failures such as slippage in traction drive units.

A primary object of the present invention is to overcome the major problems as described above and more particular to provide a toroidal continuous variable transmission in which a back plate holds a supporting shaft so as to resist against a lean of the supporting shaft to thereby limit a deviation of the rotational axis of a rolling body in a power roller within a radial clearance in a needle bearing of the supporting shaft whereby the desired speed ratio may be kept steady regardless of the speed-governing operations of the toroidal continuous variable transmission.

Another object of the present invention is to provide a toroidal continuous variable transmission in which the type of bearings is selected so as to make wider the load-carrying surface area along the axial direction to thereby suppress a lean of the supporting shaft, resulting in limiting a deviation of the rotational axis of a rolling body in a power roller within a radial clearance in a needle bearing of the supporting shaft whereby the desired speed ratio may be kept steady regardless of the speed-governing operations of the toroidal continuous variable transmission.

In another aspect of the present invention, a toroidal continuous variable transmission is provided wherein the fitting structure of a supporting shaft into a back plate is designed so that a lean of the supporting shaft is suppressed so as to limit a deviation of the output disks 3, 23, the power roller 2 is subject to the pivoting force that has a magnitude and acting direction in accordance with the deviation. FIG. 9 illustrates a power roller 2 that has deviated along operations of the toroidal continuous variable transmission.

DISCLOSURE OF INVENTION

The first invention of the present application is concerned with a toroidal continuous variable transmission comprised of an input disk connected drivingly to an input shaft, an output disk connected to an output shaft and arranged in a confronting relation with the input disk, power rollers adjustable in tilt and arranged between the input and output disks so as to transmit the rotation of the input disk to the output disk in a continuous variable rotary speed changing manner, trunnions supporting the power rollers for rotation and movable along pivotal shafts of the power rollers, and an actuator for making the trunnions move along the pivotal shafts, the power rollers being each comprised of a rolling body transmitting the rotation of the input disk to the output disk, a supporting shaft mounted rotatably on any one of the trunnions through a first bearing while supporting the rolling body for rotation through a second bearing, a back plate carried by any one of the trunnions through a third bearing, and rolling elements interposed between the rolling body and the back plate whereby the supporting shaft is combined together with the back plate as an unit.

According to the toroidal continuous variable transmission according to the first invention constructed as described above, the back plate is urged against its associated trunnion by the action of the strong thrust force applied along the axial direction of the supporting shaft from the rolling body of the power roller through rolling elements continuously whenever the toroidal continuous variable transmission operates. The back plate is thus kept from leaning and the supporting shaft integral with the back plate is also suppressed from leaning towards the trunnion. Hence the deviation of the rotational axis of the power roller along the pivotal shaft may be limited within the radial clearances in the first and second journal bearings.

In an aspect of the present invention, a toroidal continuous variable transmission is provided wherein the supporting shaft is made integral with the back plate by a close fit with the back plate. Both the supporting shaft and the back plate are formed separately from each other and then connected mechanically with each other by close fitting so as to provide the integrated structure of the supporting shaft with the back plate. By combining the supporting shaft together as an unit with the back plate during their producing process, the fitting connection of both components may be free from loosing and help ensure the integration thereof.

Moreover, in addition to the close fit of the supporting shaft in the back plate, the supporting shaft is mounted with a snap ring that makes an abutment with a load-carrying surface of the back plate, which confronts the rolling body. The snap ring abutted against the load-carrying surface of the back plate helps improve the integration of the supporting shaft with the back plate. The supporting shaft, although being close-fitted integrally with the back plate, may have the possibility of slippage at the fitting connection as a result of long-term operation of the toroidal continuous variable transmission. The snap ring is to prevent the relative slippage of the supporting shaft to the back plate, thereby making it possible to use the toroidal continuous variable transmission with reliability for a long service term. As an alternative, the integration of the supporting shaft with the back plate may be achieved the integral molding of both the components.

In another aspect of the present invention, a toroidal continuous variable transmission is provided wherein the first and second bearings are each of a needle bearing. The needle bearings are principally subject to the crowning at their opposing ends that would otherwise generate the concentrated bearing stress against the raceway. This crowning is liable to cause a lean of the supporting shaft. In contrast, according to the toroidal continuous variable transmission of the present invention, the integrated construction of the supporting shaft with the back plate may suppress as small as possible the lean of the supporting shaft owing to the crowning of the needle bearings for the first and second bearings.

The second invention of the present application relates to a toroidal continuous variable transmission comprising an input disk connected drivingly to an input shaft, an output disk connected to an output shaft and arranged in a confronting relation with the input disk, power rollers adjustable in tilt and arranged between the input and output disks so as to transmit the rotation of the input disk to the output disk in a continuous variable speed changing manner, trunnions supporting the power rollers for rotation and movable along pivotal shafts of the power rollers, and an actuator for making the trunnions move along the pivotal shafts, the power rollers being each comprised of a rolling body transmitting the rotation of the input disk to the output disk, and a supporting shaft mounted rotatably on any one of the trunnions through a first bearing while supporting the rolling body for rotation through a second bearing, and at least any one of the first and second bearings being composed of a double-row type.

According to the toroidal continuous variable transmission of the second invention constructed as described above, at least any one of the first and second bearings for carrying the supporting shaft is of a double-row bearing that may bear the rotating member, or any one of the first and second journal sections, at two locations spaced away from each other along the axial direction of the journal section. In other words, when the double-row bearing is adapted for the first bearing to carry the supporting shaft for rotation on the associated trunnion, the supporting shaft may be suppressed against a lean with respect to the trunnion so that the deviation of the rotational axis of the power roller along the pivotal shaft may be limited within the radial clearances in the first and second journal bearings. By contrast, when the double-row bearing is adapted for the second bearing to carry the rolling body for rotation on the associated supporting shaft, the supporting shaft may be suppressed against its lean by the double-row bearing at the rolling body because the rolling body is supported through the bearing so as to scarcely lean relatively to the back plate. In this design, even if the supporting shaft is mounted on the trunnion through the ordinary single-row journal bearing, the deviation of the rotational axis of the power roller along the pivotal shaft may be also limited within the radial clearances in the first and second journal bearings. Moreover, when the double-row bearings are employed in both of the first bearing for mounting the supporting shaft for rotation to the trunnion and the second bearing for carrying the rolling body for rotation on the supporting shaft, the supporting shaft is kept from a lean at either side of both the trunnion and the rolling body by the double-row bearings as described above whereby the deviation of the rotational axis of the power roller along the pivotal shaft may be suppressed.

In another aspect of the present invention, a toroidal continuous variable transmission is provided wherein the first and second bearings are of a needle bearing. The needle bearings are usually subject to the crowning at their opposing ends that would otherwise generate the concentrated bearing stress against the raceway. This crowning is liable to cause a lean of the supporting shaft. In contrast, according to the toroidal continuous variable transmission of the present invention, the double-row bearing is employed in at least any one of the first and second needle bearings to thereby suppress as small as possible the lean of the supporting shaft owing to the crowning of the needle bearings.

The third invention of the present application relates to a toroidal continuous variable transmission comprising an input disk connected drivingly to an input shaft, an output disk connected to an output shaft and arranged in a confronting relation with the input disk, power rollers adjustable in tilt and arranged between the input and output disks so as to transmit the rotation of the input disk to the output disk in a continuous variable speed changing manner, trunnions supporting the power rollers for rotation and movable along pivotal shafts of the power rollers, and an actuator for making the trunnions move along the pivotal shafts, the power rollers being each comprised of a rolling body transmitting the rotation of the input disk to the output disk, a supporting shaft mounted rotatably on any one of the trunnions through a first bearing while supporting the rolling body for rotation through a second bearing, a back plate carried by any one of the trunnions through a third bearing, rolling elements interposed between the rolling body and the back plate, the back plate being provided with a fit structure in which is fitted the supporting shaft, and the fit structure having a ridge receiving the supporting shaft therein in a fitting manner and extending towards the rolling body over a load-carrying surface on which is provided a raceway for rolling elements.

According to a toroidal continuous variable transmission of the third invention as constructed as described above, the back plate is provided with a fit structure extending towards the rolling body over a load-carrying surface on which is provided a raceway for rolling elements, so that the supporting shaft may be kept in a fitted relation with the fit structure over an axially wider range including the ridge whereby the supporting shaft is protected from leaning towards the trunnion. As a result, the deviation of the rotational axis of the power roller along the pivotal shaft is limited within the radial clearances in the first and second journal bearings.

In another aspect of the third invention, a toroidal continuous variable transmission is provided wherein the fit structure of the back plate has fitted around the supporting shaft with any one of slide fit and loose fit. On slide fit of the supporting shaft with the fit structure of the back plate, the supporting shaft is allowed to rotate in a sliding manner relatively to the fit structure. As there is, nevertheless, provided between the supporting shaft and the fit structure only the clearance of such an extent as to permit the sliding movement relatively to each other, the supporting shaft may be still kept from leaning. Even on the loose fit of the supporting shaft with the fit structure, there is provided only the small clearance of the extent that makes it possible to keep the supporting shaft from leaning.

In another aspect of the third invention constructed as described above, a toroidal continuous variable transmission is provided wherein the first and second bearings are each of a needle bearing. The needle bearings are principally subject to the crowning at their opposing ends that would otherwise generate the concentrated bearing stress against the raceway. This crowning is apt to cause a lean of the supporting shaft. According to the toroidal continuous variable transmission of the present invention, however, the ridge formed at the fit structure of the back plate may suppress as small as possible the lean of the supporting shaft owing to the crowning of the needle bearings for the first and second bearings.

BEST MODE FOR CARRYING OUT THE INVENTION

Figure 1:
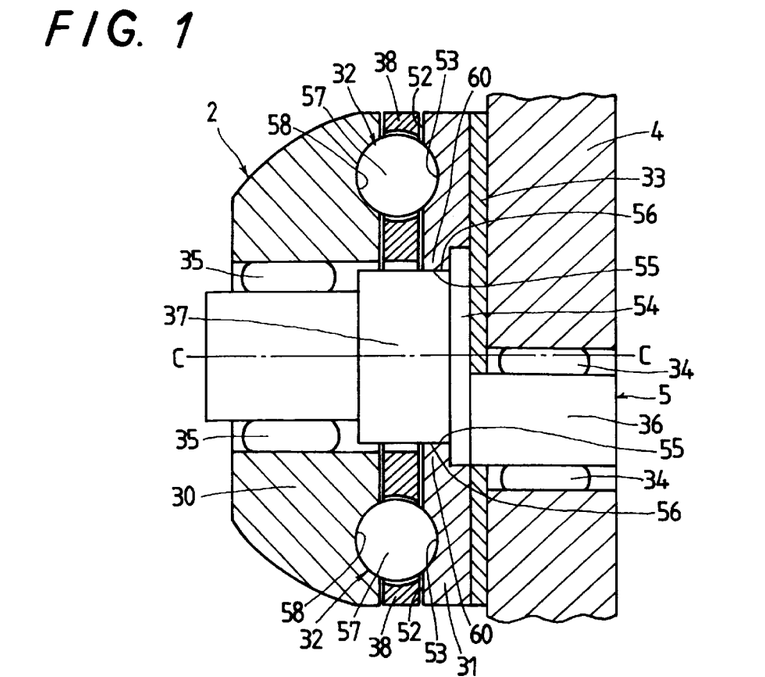
FIG. 1 is a fragmentary axial-sectional view showing a mounting structure of an adjustable power roller on a trunnion, which is adapted to a first preferred embodiment of a toroidal continuous variable transmission according to the first invention in this application.

Preferred embodiments of the toroidal continuous variable transmission according to the first invention will be explained below with reference to FIGS. 1 to 3. The fundamentals in the prior mounting structure of the trunnion to the adjustable power roller shown in FIGS. 6 to 9 may be simply applied to a mounting structure of an adjustable power roller 2 on a trunnion 4 in the exemplary embodiments shown in FIGS. 1 to 3. It will be thus noted that similar reference characters designate similar elements or components in the following description, and then the repetitive explanation of the structure and operation of the trunnion 4 and power roller 2 is omitted hereinafter. The mounting structure in FIG. 1 is different from the prior mounting structure in FIGS. 8 and 9 in such a feature that a second journal section 37 of the supporting shaft 5 is fitted in a back plate 31 by close fit design.

The back plate 31 is urged against a trunnion 4 by the action of a strong thrust force that is applied along the axial direction of the supporting shaft 5 from a rolling body 30 in the power roller 2 through a thrust bearing 32 continuously whenever the vehicle is operated, not only the torque is transmitted in the toroidal continuous variable transmission 1. It is thus to be noted that the supporting shaft 5 is kept from leaning towards the trunnion 4. The back plate 31 has a load-carrying surface 52 on which is formed an annular groove 53 serving as a raceway for rolling elements 57, preferably balls, of the thrust bearing 32. While the rolling body 30 is also provided with a raceway groove 58 arranged confronting with the raceway groove 53 so as to provide a raceway for rolling elements 57, which is defined between the confronting raceway grooves 53, 58. The second journal section 37 of the supporting shaft 5 is further flanged at its axial end 54 closely opposing another thrust bearing 33. The flange 54 is also fitted in the back plate 31. The second journal section 37 of the supporting shaft 5 is press fitted in the back plate 31 by a close fit in which there is no clearance between an inner peripheral surface of the fit structure 60 and the outer peripheral surface of the supporting shaft 5. As a result, the supporting shaft 5 scarcely might lean by the restriction integral with the back plate 31 that is kept from leaning with respect to the trunnion 4.

Needle bearings are employed for both of a first journal bearing 34 carrying the supporting shaft 5 for rotation relatively to the trunnion 4 and a second journal bearing 35 carrying the rolling body 30 for rotation relatively to the supporting shaft 5. Only the second journal bearing 35 has a radial clearance therein. As apparent from the foregoing, however, the supporting shaft 5 scarcely lean owing to the integral connection with back plate 31 that is forced against the trunnion 4 by the action of the strong thrust force. This may substantially eliminate the deviation of the rotational axis of the power roller 2 along the pivotal shaft, which might otherwise happen due to the lean of the supporting shaft 5 resulting from the existence of the radial clearances in both the first and second journal bearings 34, 35. Hence the deviation of the rotational axis C—C of the power roller 2 along the pivotal shaft may be rendered extremely small, or limited within the radial clearances, about 20 $\mu$, in the first and second journal bearings 34, 35.

According to the toroidal continuous variable transmission as described just above, in comparison of the driving phase where the applied torque is transmitted positively and the coasting phase where the vehicle is carried by inertia, there is no difference between the operating phases in the amount of the deviation of the trunnion 4 along the pivotal shaft to balance the pivoting forces so far as the desired speed ratio is identical with each other in driving and coasting. And then, there is no situation of difference in the speed ratio, which might otherwise happen in the prior art according to the operating conditions. Further, no unstable variation of the speed ratio occurs on gear changing between the driving position and the coast position, or on large variation of loading torque.

Figure 2:
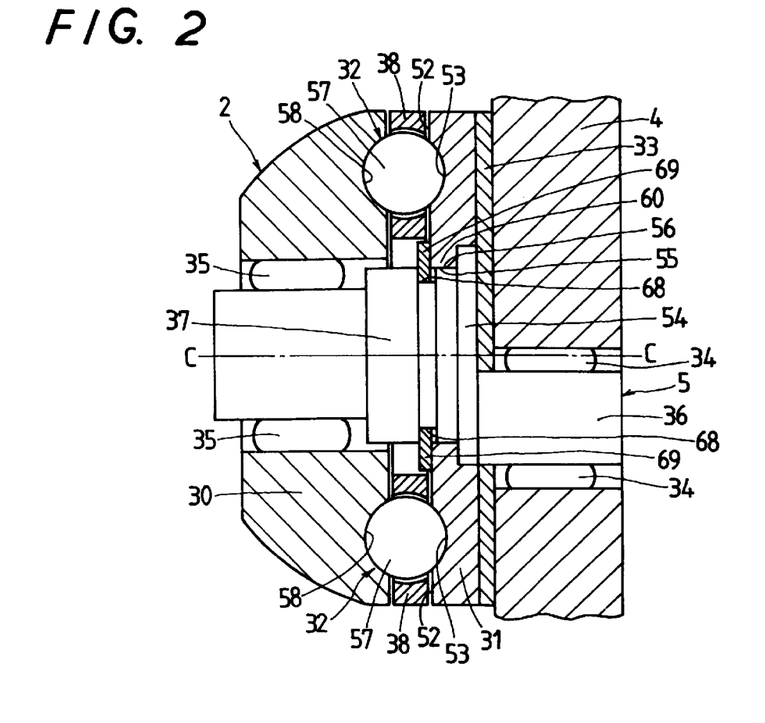
FIG. 2 is a fragmentary axial-sectional view showing another mounting structure of an adjustable power roller on a trunnion, which is adapted to a second preferred embodiment of a toroidal continuous variable transmission according to the first invention.

FIG. 2 shows another embodiment of the mounting structure of the power roller to the trunnion in the toroidal continuous variable transmission according to the first invention. Provided around the second journal section 37 of the supporting shaft 5 in face of the back plate 31 is an annular recess 68 in which is fitted a snap ring 69 so as to abut on one side thereof against the back plate 31 while on the other side thereof against the side wall of the annular recess 68. The supporting shaft 5, although being press-fitted integrally in the back plate 31, may have the possibility of an unrestored deviation in press-fitting position, which might occur due to the long-term operation or the applied large force. The snap ring is to prevent the deviation in press-fitting position.

Figure 3:
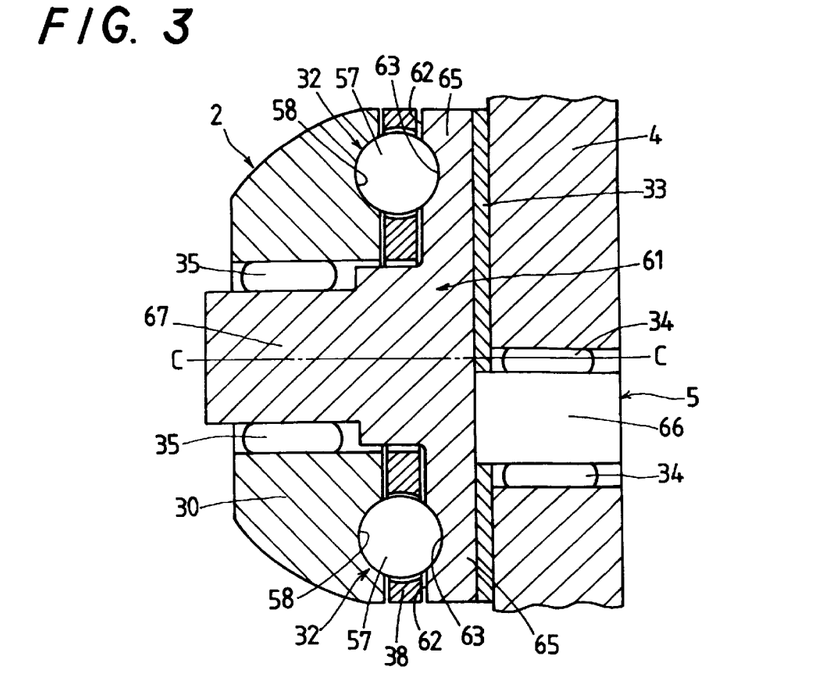
FIG. 3 is a fragmentary axial-sectional view showing a further another mounting structure of an adjustable power roller on a trunnion, which is adapted to a third preferred embodiment of a toroidal continuous variable transmission according to the first invention.

FIG. 3 shows a further another embodiment of mounting structure of the power roller to the trunnion in the toroidal continuous variable transmission according to the first invention. It is to be noted that the third embodiment of the mounting structure is similar in primary structure with the mounting structure shown in FIG. 1. The feature of this third embodiment resides in an unitary structure 61 of the supporting shaft and back plate, in which are integrally constituted a first journal section 66 supported to the trunnion 4 through the first bearing 34 for rotation, a second journal section 67 carrying the rolling body 30 thereon for rotation, and a back plate section 65 formed with the raceway for the rolling elements 57. The raceway for the rolling elements 57 is provided by forming a raceway groove 63 on a load-carrying surface of the back plate section 65.

In the embodiment in FIG. 3 having the unitary structure 61 of the supporting shaft and back plate, as the back plate section 65 is urged by the strong thrust force exerted from the thrust bearing 32, the supporting shaft section composed of the first and second journal sections 66, 67 does not lean relatively to back plate section 65, likewise with the embodiment shown in FIG. 1. Hence the deviation of the rotational axis C—C of the power roller 2 along pivotal shaft may be rendered extremely small, or limited within the extent of the radial clearances in the first and second journal bearings 34, 35.

The mounting structures for the power roller 2 in FIGS. 1 to 3 are shown as the exemplary structures for mounting to the trunnion 4 the power roller 2 that is out of the axial reference position in the toroidal transmission unit. The supporting shaft 5 is thus arranged such that the second journal section 37 or 67 for supporting thereon the rolling body 30 for rotation is eccentric with the first journal section 36 or 66 carried by the trunnion 4 for rotation. When the power roller 2 is arranged at the axial reference position of the toroidal transmission unit, the first journal section 36 or 66 and second journal section 37 or 67 are arranged co-axial relation with each other. Even if the first and second journal sections 36 or 66, 37 or 67 are in co-axial relationship with each other, the phenomenon is inevitable that the rotational axis of the power roller 2 deviates along the pivotal shaft. To cope with this, the mounting structure for the power roller 2 shown in FIGS. 1 to 3 may be effectively applied to the mounting structure of the power roller to the trunnion in the toroidal continuous variable transmission. In this case, the rolling body 30 is held against the pivoting or swinging movement.

Figure 4:
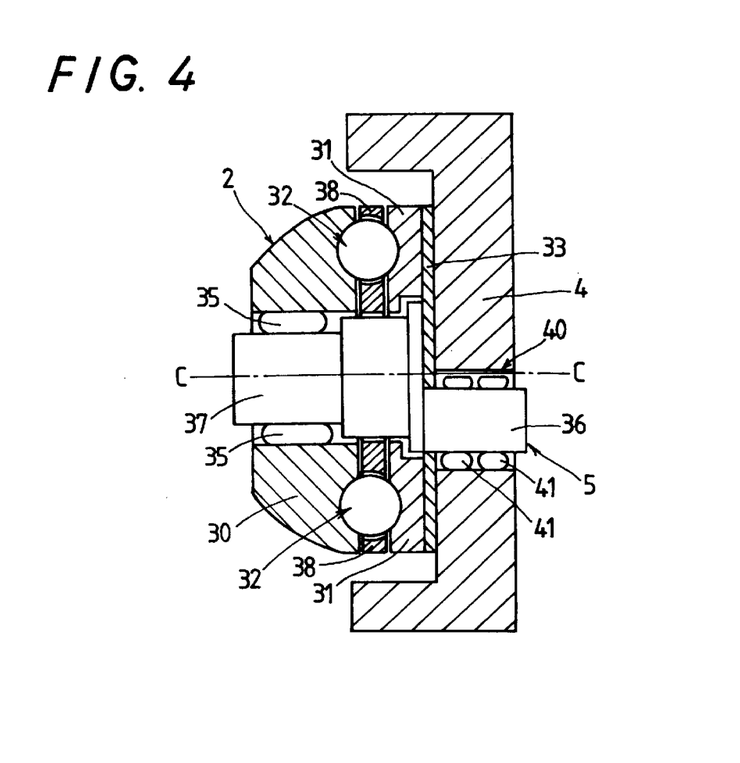
FIG. 4 is a fragmentary axial-sectional view showing a mounting structure of an adjustable power roller on a trunnion, which is adapted to a preferred embodiment of a toroidal continuous variable transmission according to the second invention.

The following will describe an embodiment of the toroidal continuous variable transmission according to the second invention with referring to FIG. 4. The fundamentals in mounting structure of power roller 2 to the trunnion 4 in FIG. 4 are substantially identical with the prior mounting structure shown in FIGS. 6 to 9. It will be thus noted that similar reference characters designate similar elements or components in the following description, and then the repetitive explanation of the structure and operation of the trunnion 4 and power roller 2 is omitted. In this arrangement, a first journal bearing 40 of a double-row type is provided for supporting the first journal section 36 of the supporting shaft 5 on the trunnion 4. That is, two rows of needle bearings 41, 41 are arranged in a juxtaposed relation along the axial direction of the supporting shaft 5.

The back plate 31 is urged against the trunnion 4 by the action of a strong thrust force that is applied along the axial direction of the supporting shaft 5 from a rolling body 30 in the power roller 2 through a thrust bearing 32. It is thus to be noted that the supporting shaft 5 is kept from leaning towards the trunnion 4. The first journal section 36 of the supporting shaft 5 is supported by the trunnion 4 for rotation through a first journal bearing 40 of double rows of needle bearing areas 41, 41, which may bear the first journal section 36 at two load-carrying areas spaced axially away from each other. The spacing distance between the juxtaposed journal bearing areas 41, 41 is sufficiently large compared with a radial clearance in the first journal bearing 40 so that the supporting shaft 5 scarcely lean regardless of the existence of a small radial clearance in the first journal bearing 40. In the meantime, the second journal bearing 35 for supporting the rolling body 30 in the power roller 2 is composed of a needle bearing that has the small radial clearance likewise with the first journal bearing 40. Consequently, the deviation of the rotational axis C—C of the power roller 2 along pivotal shaft, arising from the first and second journal bearings 40, 35, may be rendered extremely small, or limited within the radial clearances, about 20 $\mu$, in the first and second journal bearings 40, 35.

In comparison of the driving phase where the applied torque is transmitted and the coasting phase where the vehicle is carried by inertia, there is no difference in the amount of the deviation of the trunnion 4 along the pivotal shaft, caused by the lean of the supporting shaft 5, so far as the desired speed ratio is identical with each other in driving and coasting. And then, there is no situation of difference in the speed ratio, which might otherwise happen in the prior art according to the operating conditions. Further, no unstable variation of the speed ratio occurs on gear changing between the idling or driving position and the coast position, or on large variation of loading torque.

In the embodiment described just above, although at least any one of the first and second journal bearings has been shown in the form of the double-row bearing, other multi-row bearings having over three rows of rolling elements may be preferably applicable, likewise with the double-row bearing, for keeping the supporting shaft 5 from the lean relatively to the first and second bearings. It will be moreover noted that the first and second journal bearings, although described in the needle bearings, may be of roller bearings having rolling elements of cylindrical rollers or ball bearings. The mounting structure for the power roller 2 shown in FIG. 4, likewise with the embodiments in FIGS. 1 to 3, is an exemplary structure for mounting to the trunnion 4 the power roller 2 that is out of the axial reference position in the toroidal speed-changing unit. Therefore, the second journal section 37 for supporting the rolling body 30 for rotation is shown in an eccentric relation to the first journal section 36 that is supported to the trunnion 4 for rotation. This mounting structure for the power roller may be adaptable to such case that the power roller 2 is at the axial reference position in the toroidal transmission unit.

Figure 5:
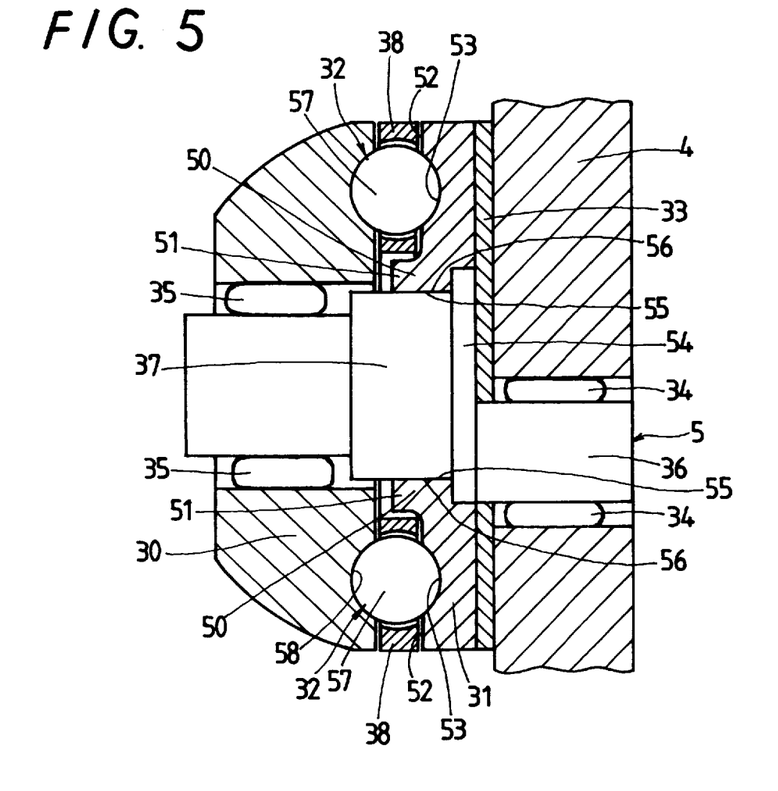
FIG. 5 is a fragmentary axial-sectional view showing a mounting structure of an adjustable power roller on a trunnion, which is adapted to a preferred embodiment of a toroidal continuous variable transmission according to the third invention.

Finally, an embodiment of the toroidal continuous variable transmission according to the third invention will be described with referring to FIG. 5. The fundamentals in mounting structure of power roller 2 to the trunnion 4 in FIG. 5 are substantially identical with the prior mounting structure shown in FIGS. 6 to 9. It will be thus noted that similar reference characters designate similar elements or components in the following description, and then the repetitive explanation of the structure and operation of the trunnion 4 and power roller 2 is omitted. In this design, the back plate 31 has an annular ridge 51 at a fit structure 50 where the second journal section 37 of the supporting shaft 5 is fitted therein.

The back plate 31 undergoes a strong thrust force along the axial direction of the supporting shaft 5 continuously whenever the toroidal continuous variable transmission 1 operates irrespective of the operational condition thereof.

Nevertheless the back plate 31, as being urged against the trunnion 4 through the thrust bearing 33, is kept from leaning. The back plate 31 has the load-carrying surface 52 on which is formed the annular groove 53 serving as the raceway for the rolling elements 57, preferably balls, of the thrust bearing 32. While the rolling body 30 is also provided with the raceway groove 58 arranged confronting with the raceway groove 53 so as to provide the raceway for rolling elements 57, which is defined between the confronting raceway grooves 53, 58. The second journal section 37 of the supporting shaft 5 is further flanged at its axial end 54 closely opposing another thrust bearing 33. The flange 54 is also fitted in the back plate 31.

The back plate 31 is provided with the annular ridge 51 that extends towards the rolling body 30 and is integral with the fit structure 50 in which is fitted the second journal section 37 of the supporting shaft 5. Hence, the fit structure may be arranged in a fitted relation with the supporting shaft 5 over an axially wider range including the ridge 51. Provided between an inner periphery 55 of the fit structure 50 and an outer periphery 56 of the second journal section 37 is a slide fit in which is allowable a relatively sliding movement, or a loose fit in which is permitted a small clearance between the confronting peripheral surfaces 55, 56. Regardless of either fit design, the fitting length of the fit structure 50 inclusive of the annular ridge 51 is sufficiently large compared with the radial clearance between the fit structure 50 and the supporting shaft 5.

The back plate 31 hardly lean because it is urged against the trunnion 4 by the action of the strong thrust force that is applied from the rolling body 30 in the power roller 2 through the thrust bearing 32. Moreover, the fitting length of the fit structure 50 of the back plate 31, inclusive of the annular ridge 51, is sufficiently large compared with the radial clearance between the fit structure 50 and the supporting shaft 5 and, therefore, the supporting shaft 5 may be prevented from leaning. Needle bearings are employed for both of the first journal bearing 34 carrying the supporting shaft 5 for rotation relatively to the trunnion 4 and the second journal bearing 35 carrying the rolling body 30 for rotation relatively to the supporting shaft 5. The second journal bearing 35 has a radial clearance therein. Suppressing the lean of the supporting shaft 5 results in substantially eliminating the amount of deviation (or off-set) of the rotational axis of the rolling body 30 in the power roller 2 along the pivotal shaft, which might otherwise happen due to the lean of the supporting shaft 5 resulting from the existence of the radial clearances in both the first and second journal bearings 34, 35. Hence the deviation of the rotational axis C—C of the power roller 2 along the pivotal shaft may be rendered extremely small, or limited within the radial clearances, about 20 $\mu$, in the first and second journal bearings 34, 35.

For reasons which have appeared above, the rotational axis C—C of the rolling body 30 scarcely deviates along the pivotal shaft of the trunnion 4 and therefore there is no situation of difference in the speed ratio, which might otherwise take place at the same desired speed ratio according to either in the driving phase where the applied torque is transmitted positively or in the coasting phase where the vehicle is carried by inertia. Further, no unstable variation of the speed ratio occurs on variation of loading torque such as gear changing between the light load driving or normal driving position and the coast position.

The annular ridge 51, although being formed integrally with the fit structure 50 in the above embodiment, may be formed separately and mounted to the fit structure 50. The mounting structure of the power roller 2 in FIG. 5 is an exemplary structure for mounting the trunnion 4 to the power roller 2 that is out of the axial reference position of the toroidal speed-changing unit. The second journal section 37 of the supporting shaft 5 for bearing the rolling body 30 for rotation is thus arranged in eccentric relation to the first journal section 36 supported in the trunnion 4 for rotation. The mounting structure of the power roller is also applicable to the power roller 2 that is arranged at the axial reference position of the toroidal speedchanging unit. In this case, it is of course that the rolling body 30 is supported for rotation on the second journal section 37 arranged concentrically with the first journal section 36.

Industrial Applicability

In accordance with the toroidal continuous variable transmission of the first invention, the back plate is urged by the action of the strong thrust force applied along the axial direction of the supporting shaft continuously whenever the toroidal continuous variable transmission operates. The back plate is kept from leaning and the supporting shaft integral with the back plate is also suppressed from leaning towards the trunnion. Hence the deviation of the rotational center of the power roller along the pivotal shaft may be limited within the radial clearances in the first and second journal bearings. Consequently the deviation of the rotational center of the power roller along the pivotal shaft is hard to occur in gear changing between the driving phase and coasting phase that are different in torque to be transmitted and there is little variation from the desired speed ratio. On dynamic change of torque owing to changing over the operating condition between the light load or normal driving phase and coasting phase, the desired speed ratio may be steady maintained with no vibratory variation of the speed ratio happens that might otherwise result in making uncomfortable the riding comfort for the driver.

Moreover according to the toroidal continuous variable transmission of the second invention, the power rollers are each is comprised of a rolling body making rolling-contact with both of the input and output disks, a first journal section supported for rotation on the trunnion through a first journal bearing, a second journal section formed integrally with the first journal section and supporting thereon a rolling body for rotation through a second journal bearing, and at least any one of the first and second journal bearings being of a double-row type that may bear the associated journal section at two locations spaced away from each other along the axial direction of the journal section so as to limit the deviation of the rotational axis of the power roller along the pivotal shaft within the radial clearances in the first and second journal bearings. The rotational center of the power roller scarcely moves along the pivotal shaft of the trunnion on either phase of the driving phase and coasting phase, which differ from each other in the amplitude of the torque to be transmitted. There is, therefore, very little in deviation from the desired speed ratio. On dynamic change of torque owing to changing over the operating condition between the light load or normal driving phase and coasting phase, the desired speed ratio may be steady maintained with no vibratory variation of the speed ratio that might otherwise result in making uncomfortable the riding comfort for the driver.

In addition, according to the toroidal continuous variable transmission of the third invention, the back plate that is an essential component of the power roller is provided with the annular ridge integral with the fit structure for the supporting shaft and extending towards the rolling body over the load-carrying surface of the back plate. Accordingly, the supporting shaft may be kept in a fitted relation with the fit structure of the back plate over an axially wide range including the ridge. The supporting shaft may be protected from leaning towards the trunnion so that the deviation of the rotational axis of the power roller along the pivotal shaft is limited within the radial clearances in the first and second journal bearings. As a result, the rotational center of the power roller scarcely moves along the pivotal shaft of the trunnion on either phase of the driving phase and coasting phase, which differ from each other in the amplitude of the torque to be transmitted. There is, therefore, very little in deviation from the desired speed ratio. On dynamic change of torque owing to changing over the operating conditions between the light load or normal driving phase and coasting phase, the desired speed ratio may be steady maintained with no vibratory variation of the speed ratio that might otherwise result in making uncomfortable the riding comfort for the driver.

What is claimed is:

1. A toroidal continuous variable transmission comprising an input disk connected drivingly to an input shaft, an output disk connected to an output shaft and arranged in a confronting relation with the input disk, power rollers adjustable in tilt and arranged between the input and output disks so as to transmit the rotation of the input disk to the output disk in a continuous variable speed changing manner, trunnions supporting the power rollers for rotation and movable along pivotal shafts of the power rollers, and an actuator for making the trunnions move along the pivotal shafts, the power rollers being each comprised of a rolling body transmitting the rotation of the input disk to the output disk, a supporting shaft mounted rotatably on any one of the trunnions through a first bearing while supporting the rolling body for rotation through a second bearing, a back plate carrier by any one of the trunnions through a third bearing, and rolling elements interposed between the rolling body and the back plate whereby the supporting shaft is combined together with the back plate as an unit, wherein the supporting shaft is made integral with the back plate by a close fit with the back plate, and the supporting shaft is mounted with a snap ring that is made in abutment with a load-carrying surface of the back plate, which confronts the rolling body.

2. A toroidal continuous variable transmission constructed as defined in claim 1, wherein the supporting shaft is formed integrally with the back plate so as to be combined together with the back plate as an unit.

3. A toroidal continuous variable transmission constructed as defined in claim 1, wherein the first and second bearings are each of a needle bearing.

4. A toroidal continuous variable transmission comprising an input disk connected drivingly to an input shaft, an output disk connected to an output shaft and arranged in a confronting relation with the input disk, power rollers adjustable in tilt and arranged between the input and output disks so as to transmit the rotation of the input disk to the output disk in a continuous variable rotary speed changing manner, trunnions supporting the power rollers for rotation and movable along pivotal shafts of the power rollers, and an actuator for making the trunnions move along the pivotal shafts, the power rollers being each comprised of a rolling body transmitting the rotation of the input disk to the output disk, and a supporting shaft mounted rotatably on any one of the trunnions through a first bearing while supporting the rolling body for rotation through a second bearing, and at least any one of the first and second bearings being composed of a double-row bearing.

5. A toroidal continuous variable transmission constructed as defined in claim 4, wherein the first and second bearings are each of a needle bearing.

6. A toroidal continuous variable transmission comprising an input disk connected drivingly to an input shaft, an output disk connected to an output shaft and arranged in a confronting relation with the input disk, power rollers adjustable in tilt and arranged between the input and output disks so as to transmit the rotation of the input disk to the output disk in a continuous variable rotary speed changing manner, trunnions supporting the power rollers for rotation and movable along pivotal shafts of the power rollers, and an actuator for making the trunnions move along the pivotal shafts, the power rollers being each comprised of a rolling body transmitting the rotation of the input disk to the output disk, a supporting shaft mounted rotatably on any one of the trunnions through a first bearing while supporting the rolling body for rotation through a second bearing, a back plate carried by any one of the trunnions through a third bearing, and rolling elements interposed between the rolling body and the back plate, the back plate being provided with a structure in which is fitted the supporting shaft, and the structure having a ridge receiving the supporting shaft therein and extending towards the rolling body over a load-carrying surface on which is provided a raceway for the rolling elements.

7. A toroidal continuous variable transmission constructed as defined in claim 6, wherein the structure has fitted around the supporting shaft with any one of slide fit and loose fit.

8. A toroidal continuous variable transmission constructed as defined in claim 6, wherein the first and second bearings are each of a needle bearing.

* * * * *